US006640620B2

(12) United States Patent
Cook et al.

(10) Patent No.: US 6,640,620 B2
(45) Date of Patent: Nov. 4, 2003

(54) AUTOMOTIVE EVAPORATIVE LEAK DETECTION SYSTEM

(75) Inventors: John E. Cook, Chatham (CA); Paul D. Perry, Chatham (CA)

(73) Assignee: Siemens Canada Limited, Ontario (CA)

(*) Notice: Subject to any disclaimer, the term of this patent is extended or adjusted under 35 U.S.C. 154(b) by 0 days.

(21) Appl. No.: 10/024,285

(22) Filed: Dec. 21, 2001

(65) Prior Publication Data

US 2002/0069692 A1 Jun. 13, 2002

Related U.S. Application Data

(62) Division of application No. 09/275,250, filed on Mar. 24, 1999, now Pat. No. 6,343,505.

(60) Provisional application No. 60/079,718, filed on Mar. 27, 1998.

(51) Int. Cl.[7] ........ G01M 19/00

(52) U.S. Cl. ........ 73/118.1

(58) Field of Search ........ 701/29, 30, 31, 701/112; 73/40, 49.2, 49.7, 116, 118.1

(56) References Cited

U.S. PATENT DOCUMENTS

| | | | | |
|---|---|---|---|---|
| 3,110,502 | A | 11/1963 | Pagano | 277/189 |
| 3,190,322 | A | 6/1965 | Brown | 141/387 |
| 3,413,840 | A | 12/1968 | Basile et al. | 73/40 |
| 3,516,279 | A | 6/1970 | Maziarka | 73/4 |
| 3,586,016 | A | 6/1971 | Meyn | 137/39 |
| 3,640,501 | A | 2/1972 | Walton | 251/332 |
| 3,720,090 | A | 3/1973 | Halpert et al. | 73/4 |
| 3,802,267 | A | 4/1974 | Lofink | 73/279 |
| 3,841,344 | A | 10/1974 | Slack | 137/88 |
| 3,861,646 | A | 1/1975 | Douglas | 251/356 |
| 3,927,553 | A | 12/1975 | Frantz | 73/4 |
| 4,009,985 | A | 3/1977 | Hirt | 431/5 |
| 4,136,854 | A | 1/1979 | Ehmig et al. | 251/333 |
| 4,164,168 | A | 8/1979 | Tateoka | 91/376 |
| 4,166,485 | A | 9/1979 | Wokas | 141/52 |
| 4,215,846 | A | 8/1980 | Ishizuka et al. | 251/298 |

(List continued on next page.)

OTHER PUBLICATIONS

U.S. Patent Appln. No. 09893,530 Craig Weldon, filed Jun. 29, 2001.
U.S. Patent Appln. No. 09/893,508, Craig Weldon, filed Jun. 29, 2001.
U.S. Patent Appln. No. 09/566,138, Paul D. Perry, filed May 5, 2000.
U.S. Patent Appln. No. 09/566,137, Paul D. Perry, filed May 5, 2000.
U.S. Patent Appln. No. 09/566,136, Paul D. Perry et al., filed May 5, 2000.
U.S. Patent Appln. No. 09/566,135, Paul D. Perry, filed May 5, 2000.

(List continued on next page.)

*Primary Examiner*—William Oen

(57) ABSTRACT

A leak detection monitor (22; 222) for an on-board evaporative emission leak detection system that detects leakage from an evaporative emission space of a fuel system of an automotive vehicle. One embodiment (22) utilizes engine intake system vacuum to vent the evaporative emission space to atmosphere when the engine is running; another (222), an electromagnet actuator (270, 280). Venting ceases when the engine is shut off. Changes in vapor pressure in the evaporative emission space are monitored over time by electric devices (74; 282) after the engine has been shut off to distinguish between a gross leak, a small leak smaller than a gross leak, and a leak that is at most smaller than a small leak.

73 Claims, 5 Drawing Sheets

U.S. PATENT DOCUMENTS

| | | | | |
|---|---|---|---|---|
| 4,240,467 | A | 12/1980 | Blatt et al. | 137/625.66 |
| 4,244,554 | A | 1/1981 | DiMauro et al. | 251/61.1 |
| 4,354,383 | A | 10/1982 | Hartel | 73/290 |
| 4,368,366 | A | 1/1983 | Kitamura et al. | 200/83 |
| 4,474,208 | A | 10/1984 | Looney | 137/516.29 |
| 4,494,571 | A | 1/1985 | Seegers et al. | 137/596.16 |
| 4,518,329 | A | 5/1985 | Weaver | 417/566 |
| 4,561,297 | A | 12/1985 | Holland | 73/119 |
| 4,616,114 | A | 10/1986 | Strasser | 200/83 |
| 4,717,117 | A | 1/1988 | Cook | 251/61.1 |
| 4,766,557 | A | 8/1988 | Twerdochlib | 702/51 |
| 4,766,927 | A | 8/1988 | Conatser | 137/315 |
| 4,852,054 | A | 7/1989 | Mastandrea | 702/51 |
| 4,901,559 | A | 2/1990 | Grabner | 73/64.45 |
| 4,905,505 | A | 3/1990 | Reed | 73/64.46 |
| 5,036,823 | A | 8/1991 | MacKinnon | 123/520 |
| 5,069,188 | A | 12/1991 | Cook | 123/520 |
| 5,090,234 | A | 2/1992 | Maresca, Jr. et al. | 73/49.1 |
| 5,096,029 | A | 3/1992 | Bauer et al. | 188/300 |
| 5,101,710 | A | 4/1992 | Baucom | 454/238 |
| 5,253,629 | A | 10/1993 | Fornuto et al. | 123/519 |
| 5,259,424 | A | 11/1993 | Miller et al. | 141/4 |
| 5,263,462 | A | 11/1993 | Reddy | 123/520 |
| 5,273,071 | A | 12/1993 | Oberrecht | 137/614.06 |
| 5,327,934 | A | 7/1994 | Thompson | 137/588 |
| 5,337,262 | A | 8/1994 | Luthi et al. | 364/580 |
| 5,372,032 | A | 12/1994 | Filippi et al. | 73/40.5 |
| 5,375,455 | A | 12/1994 | Maresca, Jr. et al. | 73/40.5 |
| 5,388,613 | A | 2/1995 | Kruger | 137/625.34 |
| 5,390,643 | A | 2/1995 | Sekine | 123/514 |
| 5,390,645 | A | 2/1995 | Cook et al. | 123/520 |
| 5,415,033 | A | 5/1995 | Maresca, Jr. et al. | 73/40.5 |
| 5,448,980 | A | 9/1995 | Kawamura et al. | 123/520 |
| 5,507,176 | A | 4/1996 | Kammeraad et al. | 73/49.2 |
| 5,524,662 | A | 6/1996 | Benjey et al. | 137/43 |
| 5,564,306 | A | 10/1996 | Miller | 73/861 |
| 5,579,742 | A | 12/1996 | Yamazaki et al. | 123/520 |
| 5,584,271 | A | 12/1996 | Sakata | 123/188.6 |
| 5,603,349 | A | 2/1997 | Harris | 137/588 |
| 5,614,665 | A | 3/1997 | Curran et al. | 73/118.1 |
| 5,635,630 | A | 6/1997 | Dawson et al. | 73/40.5 |
| 5,644,072 | A | 7/1997 | Chirco et al. | 73/49.2 |
| 5,671,718 | A | 9/1997 | Curran et al. | 123/520 |
| 5,681,151 | A | 10/1997 | Wood | 417/307 |
| 5,687,633 | A | 11/1997 | Eady | 92/97 |
| 5,743,169 | A | 4/1998 | Yamada | 92/100 |
| 5,893,389 | A | 4/1999 | Cunningham | 137/516.27 |
| 5,894,784 | A | 4/1999 | Bobbitt, III et al. | 92/100 |
| 5,979,869 | A | 11/1999 | Hiddessen | 251/285 |
| 6,003,499 | A | 12/1999 | Devall et al. | 123/520 |
| 6,073,487 | A | 6/2000 | Dawson | 73/118.1 |
| 6,089,081 | A | 7/2000 | Cook et al. | 73/118.1 |
| 6,142,062 | A | 11/2000 | Streitman | 92/99 |
| 6,145,430 | A | 11/2000 | Able et al. | 92/93 |
| 6,168,168 | B1 | 1/2001 | Brown | 277/637 |
| 6,202,688 | B1 | 3/2001 | Khadim | 137/599.08 |
| 6,203,022 | B1 | 3/2001 | Struschka et al. | 277/572 |
| 6,328,021 | B1 | 12/2001 | Perry et al. | 123/518 |

OTHER PUBLICATIONS

U.S. Patent Appln. No. 09/566,133 Paul D. Perry, filed May 5, 2000.

U.S. Patent Appln. No. 09/565,028, Paul D. Perry et al., filed May 5, 2000.

U.S. Patent Appln. No. 09/543,748 Paul D. Perry, filed Apr. 5, 2000.

U.S. Patent Appln. No. 09/543,747, Paul D. Perry et al., filed Apr. 5, 2000.

U.S. Patent Appln. No. 09/543,742, Paul D. Perry, filed Apr. 5, 2000.

U.S. Patent Appln. No. 09/543,741, Paul D. Perry, filed Apr. 5, 2000.

U.S. Patent Appln. No. 09/543,740, Paul D. Perry et al., filed Mar. 31, 2000.

U.S. Patent Appln. No. 09/542,052, Paul D. Perry et al., filed Mar. 31, 2000.

U.S. Patent Appln. No. 09/540,491, Paul D. Perry, filed Mar. 31, 2000.

U.S. Patent Appln. No. 09/165,772, John E. Cook, et al., filed Oct. 2, 1998.

AUTOMOTIVE EVAPORATIVE LEAK DETECTION SYSTEM

REFERENCE TO RELATED APPLICATION AND PRIORITY CLAIM

This is a divisional of application Ser. No. 04/275,450 filed Mar. 24, 1999 now U.S. Pat. No. 6,343,505 which expressly claims the benefit of earlier filing date and right of priority from the following patent application: U.S. Provisional Application Ser. No. 60/079,718 filed on Mar. 27, 1998 in the names of Cook and Perry and bearing the same title. The entirety of that earlier-filed, co-pending patent application is hereby expressly incorporated herein by reference.

FIELD OF THE INVENTION

This invention relates generally to a monitor for on-board detection of fuel vapor leakage from an evaporative emission space of an automotive vehicle fuel system, and more particularly to a leak detection monitor for distinguishing between presence of a gross leak, presence of a small leak that is less than a gross leak, and absence of a leak.

BACKGROUND OF THE INVENTION

A known on-board evaporative emission control system of an automotive vehicle comprises a vapor collection canister that collects volatile fuel vapors generated in the headspace of a fuel tank by the volatilization of liquid fuel in the tank and a purge valve for periodically purging fuel vapors to an intake manifold of the engine. A known type of purge valve, sometimes called a canister purge solenoid (or CPS) valve, comprises a solenoid actuator that is under the control of a microprocessor-based engine management system, sometimes referred to by various names, such as an engine management computer or an engine electronic control unit.

During conditions conducive to purging, evaporative emission space that is cooperatively defined primarily by the tank headspace and the canister is purged to the engine intake manifold through the canister purge valve. A CPS-type valve is opened by a signal from the engine management computer in an amount that allows intake manifold vacuum to draw fuel vapors that are present in the tank headspace and/or stored in the canister for entrainment with combustible mixture passing into the engine's combustion chamber space at a rate consistent with engine operation so as to provide both acceptable vehicle driveability and an acceptable level of exhaust emissions.

Certain governmental regulations require that certain automotive vehicles powered by internal combustion engines which operate on volatile fuels such as gasoline, have evaporative emission control systems equipped with an on-board diagnostic capability for determining if a leak is present in the evaporative emission space. It has heretofore been proposed to make such a determination by temporarily creating a pressure condition in the evaporative emission space that is substantially different from the ambient atmospheric pressure, and then watching for a change in that substantially different pressure that is indicative of a leak.

Two known types of vapor leak detection systems for determining integrity of an evaporative emission space are a positive pressure system that performs a test by positively pressurizing an evaporative emission space; and a negative pressure (i.e. vacuum) system that performs a test by negatively pressurizing (i.e. drawing vacuum in) an evaporative emission space.

Some sources believe that meaningful leak detection testing can be performed without necessarily striving to obtain a measurement of effective leak size area. Accordingly, it has been proposed to monitor vapor pressure in an evaporative emission space over time, to detect the attainment, or non-attainment, of certain superatmospheric and subatmospheric thresholds, and to utilize the result to categorize the evaporative emission space as having one of: a gross leak, a small leak, or no leak.

SUMMARY OF THE INVENTION

One general aspect of the invention relates to a leak detection monitor for an on-board evaporative emission leak detection system that detects leakage from an evaporative emission space of a fuel system for an engine of an automotive vehicle, the leak detection monitor comprising: a housing enclosing an interior space communicated to atmosphere; a port for communication with the evaporative emission space; a vent valve that is selectively operable to a first state for opening the port to the interior space and thereby venting the evaporative emission space to atmosphere and to a second state for closing the port to the interior space and thereby not venting the evaporative emission space to atmosphere; an electric device for sensing pressure differential between the port and the interior space indicative of pressure in the evaporative emission space relative to atmosphere within a range that includes a predetermined positive pressure useful in making a determination about leakage from the evaporative emission space and a predetermined negative pressure useful in making a determination about leakage from the evaporative emission space, and providing a corresponding signal; and an actuator for causing the vent valve to be open when the engine is running and to be closed when the engine is not running.

Another aspect relates to a leak detection monitor for an on-board evaporative emission leak detection system that detects leakage from an evaporative emission space of a fuel system for an engine of an automotive vehicle, the leak detection monitor comprising: a housing enclosing an interior space; a movable wall dividing the interior space into a first chamber space and a second chamber space; a first port for communication to atmosphere and terminating within the second chamber space in a seat; a valve carried by the movable wall for selectively seating on and unseating from the seat to selectively open and close the second chamber space relative to the first port; a second port for communicating the second chamber space to the evaporative emission space; a third port for communicating the first chamber space to an intake system of the engine to selectively position the movable wall within the interior space to one position when the engine is running and to another position when the engine is not running; and an electric device for sensing pressure differential between the first port and the second port indicative of pressure in the evaporative emission space relative to atmosphere within a range that includes a predetermined positive pressure useful in making a determination about leakage from the evaporative emission space and a predetermined negative pressure useful in making a determination about leakage from the evaporative emission space, and providing a corresponding signal.

Still another aspect of the invention relates to a leak detection monitor for an on-board evaporative emission leak detection system that detects leakage from an evaporative emission space of a fuel system for an engine of an automotive vehicle, the leak detection monitor comprising: a housing enclosing an interior space; a first port for communicating the interior space to atmosphere; a second port for communicating the interior space to the evaporative emission space; an electric operated valve within the interior space for opening one of the ports to the interior space when the engine is running and for closing the one port to the interior space when the engine is not running; an electric device for sensing pressure differential between the first port and the second port indicative of pressure in the evaporative emission space relative to atmosphere within a range that includes a predetermined positive pressure useful in making a determination about leakage from the evaporative emission space and a predetermined negative pressure useful in making a determination about leakage from the evaporative emission space, and providing a corresponding signal.

Further aspects of the invention will be presented in the following drawings, detailed description, and claims.

BRIEF DESCRIPTION OF THE DRAWINGS

The accompanying drawings, which are incorporated herein and constitute part of this specification, include one or more presently preferred embodiments of the invention, and together with a general description given above and a detailed description given below, serve to disclose principles of the invention in accordance with a best mode contemplated for carrying out the invention.

DESCRIPTION OF THE PREFERRED EMBODIMENT

The ability of leak detection apparatus to ascertain the presence or absence of a leak, and to distinguish gross leaks from smaller leaks may provide compliance with relevant requirements. Moreover, an ability to perform a leak test while a vehicle is not operating may be considered advantageous.

One aspect of the present invention relates to a leak detection monitor, sometimes referred to as an LDM, that possesses such capabilities, as will be explained with references to FIGS. 4 and 5. That leak detection monitor utilizes information relating to certain events that, under certain ambient conditions, naturally ensue after a vehicle that had been running is parked and its engine shut off. Vapor pressure in evaporative emission space, which includes the tank headspace, is monitored over a period of time. The result of such monitoring is used to identify one of three conditions, namely: no leak, meaning the absence of any significant leak; the presence of a gross leak; and the presence of a leak smaller than a gross leak.

Figure 1:
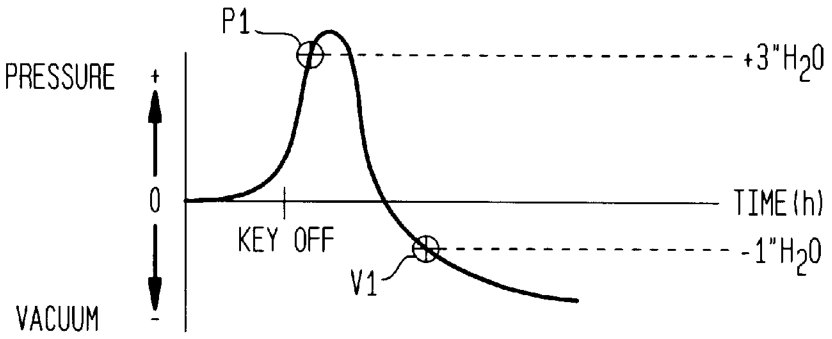
FIG. 1 is a first graph plot useful in explaining a theory upon which certain principles of the invention are premised.
Figure 2:
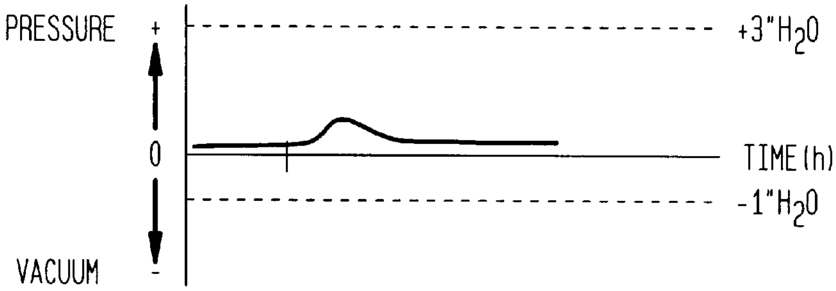
FIG. 2 is a second graph plot useful in explaining the theory.
Figure 3:
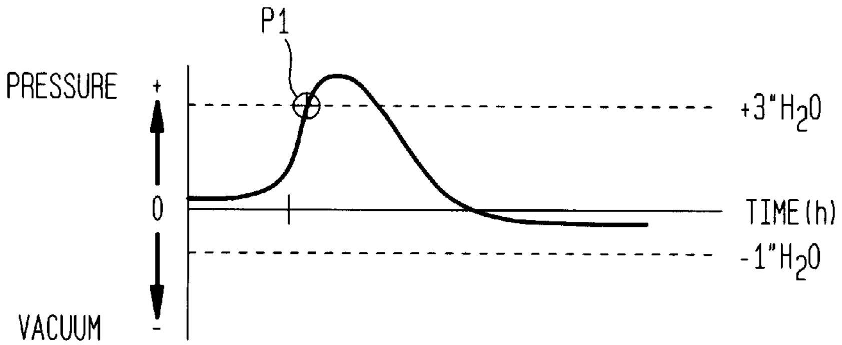
FIG. 3 is a third graph plot useful in explaining the theory.

An example that demonstrates a theory underlying such determinations is presented by FIGS. 1, 2, and 3. Each Figure is representative of one of the three possible conditions that the leak detection monitor can detect, and comprises a respective representative graph plot of vapor pressure, as a function of time, in the evaporative emission control space of an automotive vehicle fuel system that holds a supply of volatile liquid fuel for the engine of the vehicle.

The marker KEY OFF in FIG. 1 designates the time at which the vehicle key switch is operated to turn off the engine after a period of driving. Prior to the engine being turned off, pressure in the space will have been approximately atmospheric. Under certain ambient conditions, the pressure in the space will begin to rise after the engine has been shut off and certain valve closures, which seal the fuel system from atmosphere, have occurred. An example of such an event can occur when a car is parked in a heated garage after a trip and its engine is turned off.

The pressure rise may be attributable to certain thermal effects in the ensealed space. For example, a canister purge valve and a tank vapor vent valve are typically closed when the engine is not running. As a result, the ensealed evaporative emission space, which includes the tank headspace, can neither vent to the engine intake system nor vent to atmosphere. With the vehicle not running, an inability to dissipate heat from the fuel tank and environs as quickly as when the vehicle was running may arise. That inability can occasion increasing volatilization of liquid fuel in the tank. Such an event can manifest itself by the creation of superatmospheric pressure in the evaporative emission space.

If the engine remains off for an extended period of time, thermal gradients that induced the superatmospheric pressure rise tend to dissipate, and so the fuel system temperature will begin to approach ambient temperature and track changes in that temperature. When that happens, fuel vapor will begin to condense, and superatmospheric pressures in the evaporative emission space will wane.

Depending on the presence or absence of a leak, and its size, tracking the vapor pressure in the tank headspace can, over time, develop information useful in making a determination about the existence or non-existence of a leak in the evaporative emission space and whether any such leak is a gross, or smaller, leak.

FIG. 1 is a representative graph plot of pressure versus time for an evaporative emission space that is essentially devoid of leakage. Because there is essentially no leakage, the vapor pressure will initially rise into the range of superatmospheric (i.e. positive) pressures, attaining some predetermined threshold, such as that marked by the bullet P1. Subsequently, pressure will fall back, passing into the subatmospheric (i.e. vacuum) range, attaining some predetermined vacuum threshold, such as that, marked by the bullet V1. The bullet P1 defines a value that, for the particular fuel system, has been determined to be indicative of the absence of a large, or gross, leak. The bullet V1 defines a value that, for the particular fuel system, has been determined to be indicative of the absence of a small leak, whose size is less than that of a large leak, but nonetheless non-zero. In monitoring the vapor pressure over time, the sensing of both the vapor pressure attaining a value P1 and, subsequently, the vapor pressure attaining a value V1, is deemed to indicate the absence of a leak, or at most a leak smaller than a small leak.

FIG. 2 depicts a representative graph plot for an evaporative emission space that has a gross leak. Because of a gross leak, the vapor pressure in the evaporative emission space will remain near atmospheric. That precludes the attainment of vapor pressures having either P1 or V1 values.

FIG. 3 shows a representative graph plot for an evaporative emission space that has a detectable leak that is smaller than a gross leak. Such a small leak will not be able to bleed vapor sufficiently fast to prevent an initial vapor pressure rise into the superatmospheric range to the level of bullet P1. But as the pressure ebbs into the subatmospheric range, it changes more gradually, and that allows air to enter through the leak at a sufficient rate to prevent the vacuum in the evaporative emission space from attaining the level of bullet V1. Accordingly, initial attainment of positive vapor pressure of at least P1 magnitude, followed by inability of the pressure to drop to the subatmospheric level of vacuum V1 within an allotted time, signals the presence of a small leak—smaller than a gross leak. In the examples of FIGS. 1, 2, and 3, P1 is a positive pressure of three inches water, and V1, a vacuum of one inch water. Values for P1 and V1 other than three inches water and one inch water, respectively, may be appropriate for embodiments of the invention other than the particular one described here.

Figure 4:
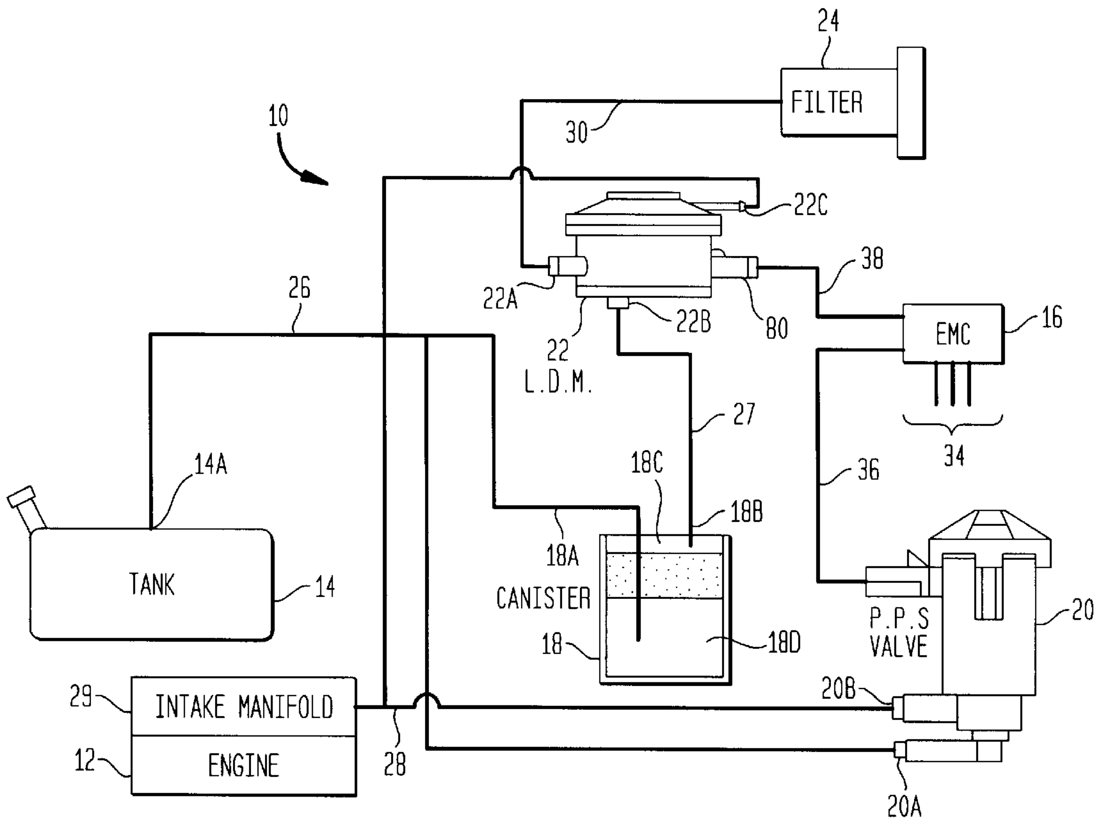
FIG. 4 is general schematic diagram of an exemplary automotive vehicle evaporative emission control system including a leak detection monitor embodying principles of the invention.

FIG. 4 shows an automotive vehicle evaporative emission control (EEC) system 10 in association with an internal combustion engine 12 that powers the vehicle, a fuel tank 14 that holds a supply of volatile liquid fuel for the engine, and an engine management computer (EMC) 16 that exercises certain controls over operation of engine 12. EEC system 10 comprises a vapor collection canister (charcoal canister) 18, a proportional purge solenoid (PPS) valve 20, a leak detection monitor (LDM) 22, and a particulate filter 24. In the illustrated schematic, leak detection monitor 22 and canister 18 are portrayed as separate assemblies, but alternatively they could be integrated into a single assembly. Similarly, filter 24 could be integrated with such an assembly, or with leak detection monitor 22.

The interior of canister 18 comprises a vapor adsorptive medium 18M that separates a clean air side 18C of the canister's interior from a dirty air side 18D to prevent transpassing of fuel vapor from the latter to the former. An inlet port 20A of PPS valve 20 and a tank headspace port 14A that provides communication with headspace of fuel tank 14 are placed in common fluid communication with a port 18A of canister 18 by a fluid passage 26. Port 18A communicates passage 26 to dirty air side 18D within canister 18. Canister 18 has another port 18B in communication with clean air side 18C. A fluid passage 27 communicates port 18B to a port 22B of LDM 22. Another fluid passage 30 communicates another port 22A of LDM 22 through filter 24 to atmosphere. Another fluid passage 28 places an outlet port 20B of PPS valve 20, a port 22C of LDM 22, and an air intake system 29 of engine 12 in common communication.

Headspace of tank 14, dirty air side 18D of canister 18, and fluid conduit 26 thereby collectively define an evaporative emission space within which fuel vapors generated by volatilization of fuel in tank 14 are temporarily confined and collected until purged to intake manifold 29 via the opening of PPS valve 20 by EMC 16.

EMC 16 receives a number of inputs, collectively designated 34, (engine-related parameters for example) relevant to control of certain operations of engine 12 and its associated systems, including EEC system 10. One electrical output port of EMC 16 controls PPS valve 20 via an electrical connection 36; other ports of EMC 16 are coupled with LDM 22 via an electrical connection, depicted generally by the reference numeral 38.

At times of engine running, LDM 22 provides an open vent path from the evaporative emission space, through itself and filter 24, to atmosphere. This allows the evaporative emission space to breathe, but without allowing escape of fuel vapors to atmosphere due to the presence of vapor collection medium 18M in the vent path to atmosphere.

EMC 16 selectively operates PPS valve 20 such that the valve opens under conditions conducive to purging and closes under conditions not conducive to purging. Thus, during times of operation of the automotive vehicle, the canister purge function is performed in a manner suitable for the particular vehicle and engine, and no leak detection test is performed.

Figure 5:
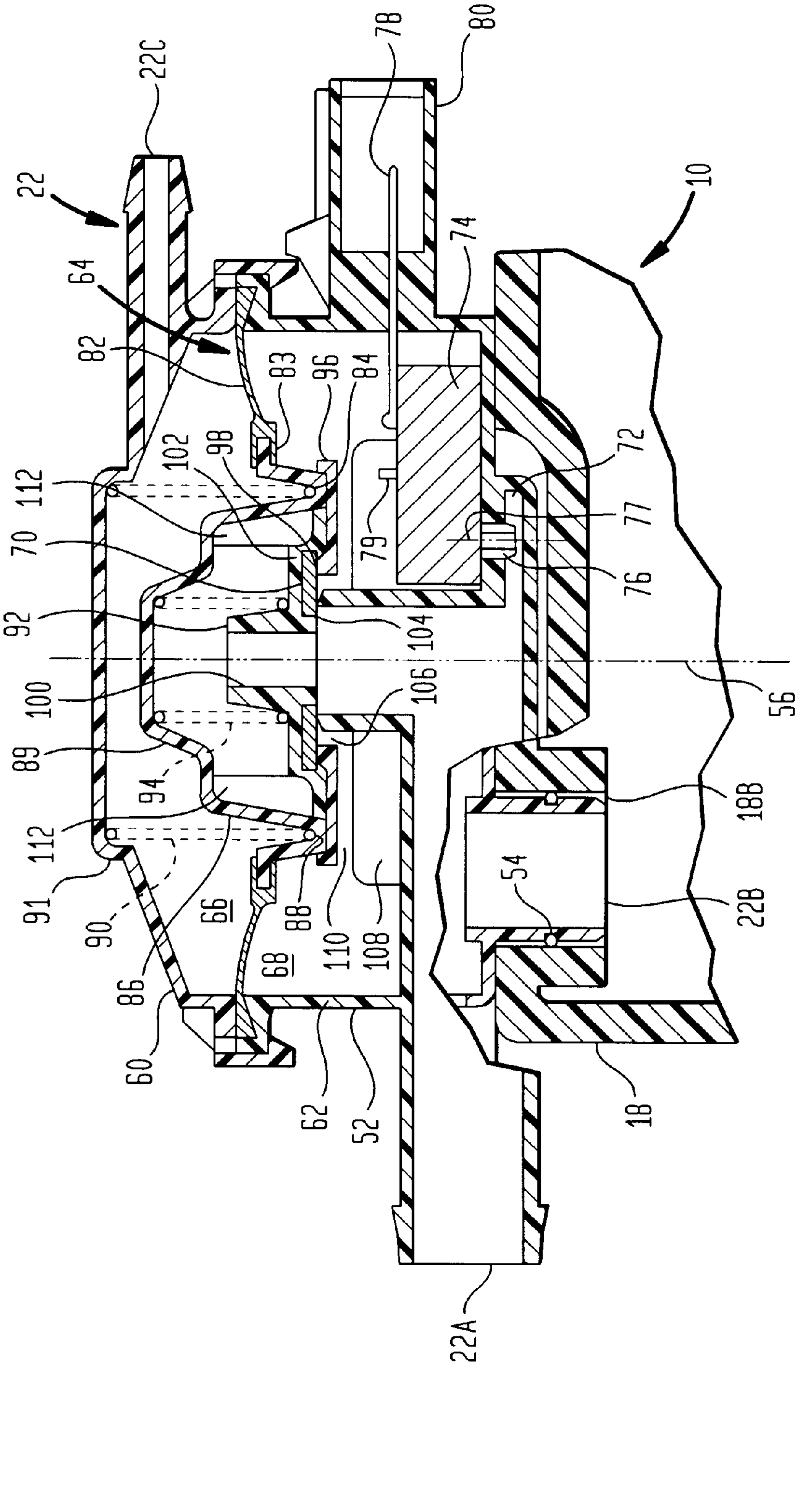
FIG. 5 is a cross section view showing detail of the leak detection monitor of FIG. 4, the broken away portion of the cross section view being taken at a different circumferential location about the axis of the leak detection monitor.

FIG. 5 illustrates a first embodiment of leak detection monitor 22 in association with evaporative emission control system 10. In particular, leak detection monitor 22 is shown disposed atop canister 18. LDM 22 comprises a walled housing 52 having a central longitudinal axis 56. Port 22B (appearing in the broken away portion of the cross section) is formed as a nipple in a bottom wall of housing 52, and port 22A as a nipple in a side wall of housing 52. Port 18B is formed as a through-hole in a top wall of canister 18. An O-ring 54 is disposed around the outside of the nipple forming port 22B to provide a gas-tight seal between itself and the wall of the through-hole forming port 18B with the nipple inserted into the through-hole as shown. The nipple forming port 22B is parallel to, but spaced radially from, axis 56, while the nipple forming port 22A is radial to axis 56, but is circumferentially offset from the nipple forming port 22B. The nipple forming port 22C extends radially outward from the housing side wall, and is spaced axially from the nipple forming port 22B.

Housing 52 comprises a first housing part 60 and a second housing part 62. Part 60 forms the top wall and an upper portion of the side wall of the housing, and includes the nipple forming port 22C; part 62, a lower portion of the side wall and the bottom wall, and includes the two nipples forming ports 22A and 22B. Parts 60, 62 fasten together, such as by catches, at circular perimeters to capture the outer perimeter margin of a movable wall 64 that divides interior space of housing 52 into a first chamber space 66 and a second chamber space 68. The nipple that forms port 22C is open to chamber space 66. The nipple that forms port 22B is open to chamber space 68. The nipple that forms port 22A is an integral formation of part 62 that extends radially inward to axis 56 where it forms an elbow that extends coaxial with axis 56 to end within chamber space 68 as a circular seat 70 that is perpendicular to axis 56.

In a region of the bottom housing wall contiguous with the elbow, port 22A comprises an alcove 72. The body of a sensor 74 is disposed within chamber space 68 on the housing bottom wall between the elbow and the housing side wall. A nipple that forms a first sensing port 76 of sensor 74 protrudes from the sensor body to pass through a small hole in the housing bottom wall to communicate the sensing port to port 22A allowing the sensor to sense atmospheric pressure. An O-ring 77 provides a gas-tight seal between the wall of that hole and the nipple. Sensor 74 has a second sensing port 79 that is open to chamber space 68. Because chamber space 68 is communicated via ports 22B, 18B to the evaporative emission space, it senses whatever pressure is present there. Electric terminals 78 of sensor 74 protrude from the sensor body, passing through the housing side wall in gas-tight fashion where they are bounded by a surround 80 to form a connector that when mated with a mating connector (not shown) of connection 38, places sensor 74 is circuit with EMC 16 so that a signal representing differential, either positive or negative, between the sensed pressures at ports 76, 79 is communicated to EMC 16.

Movable wall 64 comprises a circular annular diaphragm 82 whose outer margin forms the outer margin of wall 64 that is held captured between parts 60 and 62 to seal the outer margin of wall 64 to the housing side wall. The inner margin of diaphragm 82 joins in gas-tight fashion to the outwardly turned lip of a flange 83 that encircles a circular rim 84 of an imperforate inverted cup 86 that completes wall 64. Flange 83, rim 84, and a portion of cup 86 immediately inward of rim 84, provide cup 86 with an upwardly open circular groove 88. Radially inward of groove 88, cup 86 contains a shoulder that bounds a circular depression 89 that is depressed upward toward the housing top wall. The housing top wall also contains an upward depression 91 coaxial with axis 56. One axial end of a helical coil compression spring 90 that is disposed coaxial with axis 56 seats in depression 91 while the opposite end seats in groove 88.

Cup 86 contains a poppet 92 that is spring-loaded by a helical coiled compression spring 94. A circular annular poppet retainer 96 is joined to cup 86 with the outer margin of the retainer seated on and sealed to rim 84. A radially inner portion of retainer 96 overlaps the downwardly open interior of cup 86, and on its face that is toward the cup's interior, the radially inner margin of retainer 96 contains a raised circular sealing bead 98 that has a somewhat semi-spherical shape in radial cross section.

Poppet 92 comprises a tubular stem 100 and a circular radial flange 102 that is disposed about the lower axial end of stem 100. A face of flange 102 that is toward seat 70 contains a groove that extends about its outer margin, and a circular, annular seal 104 is disposed on poppet 92 in that groove. One axial end of spring 94 seats in depression 89, and the opposite end fits over stem 100 to seat against flange 102.

FIG. 5 shows LDM 22 in a condition of repose where the gas pressures in its various ports and chamber spaces are the same. Both springs are resiliently compressed such that a radially inner margin of seal 104 seals against seat 70 closing port 22A to chamber space 68 and a radially outer margin of seal 104 seats on the radially inner margin of retainer 96, sealing against bead 98. The inside diameter (I.D.) of retainer 96 is larger than the outside diameter (O.D.) of seat 70 so that an annular gap 106 exists between them in this condition of LDM 22.

Housing part 62 includes several partitions 108 within chamber space 68. The partitions are spaced apart circumferentially about axis 56, lying in different radial planes. Each partition has approximately a rectangular shape comprising an axially extending, radially inner edge joining with the wall of port 22A axially below seat 70 and a radially extending, axially lower edge that joins with the bottom housing wall. The third and fourth edges of each partition are an axially extending, radially outer edge that is spaced radially inward of the housing side wall and a radially extending, axially upper edge that is spaced axially below retainer 96 by an intervening annular gap 110 that is present when LDM 22 is in the condition of repose shown by FIG. 5. The two gaps 106, 110 are contiguous, and form part of chamber space 68 in the condition of repose.

The interior of cup 86 contains several partitions 112 that are spaced apart circumferentially about axis 56 in different radial directions on the cup side wall between rim 86 and depression 89. Each partition has approximately a rectangular shape comprising an axially extending, radially outer edge and a radially extending, axially upper edge both of which join with the cup side wall. The third and fourth edges of each partition 112 are an axially extending, radially inner edge that is spaced radially inward of the cup side wall and a radially extending, axially lower edge that is spaced axially above retainer 96. The axially extending, radially inner edges of partitions 112 define essentially a right circular cylinder just slightly larger than the O.D. of poppet flange 102. As such, the partitions provide guidance for axial travel of poppet 92 relative to cup 86, as will become more apparent as the description proceeds. Diaphragm 82, by itself, provides sufficient guidance for axial displacement of cup 86 within housing 52 to maintain the cup substantially coaxial with axis 56. In view of the foregoing detailed description of LDM 22, its operation can now be explained.

Because port 22C is communicated to the engine intake system by passage 28, and because the engine intake system develops vacuum while the engine is running, the running engine creates sub-atmospheric pressures in chamber space 66. The spring characteristics of spring 90 are chosen such that those sub-atmospheric pressures will be sufficient in relation to force applied to the opposite face of movable wall 64 to cause movable wall 64 to be displaced toward chamber space 66, with retainer 96 pulling poppet 92 off seat 70. This allows the atmospheric pressure at port 22A to extend into chamber space 68 and to the canister vent port 18A, thereby venting the evaporative emission space to atmosphere. Canister purging by valve 20 can occur, as appropriate, during continuance of engine running.

When the engine is shut off, intake system vacuum is lost, and so the pressure in chamber space 66 returns to atmospheric. Spring 90 now displaces movable wall 64 to ward chamber space 68, forcing poppet 92 to once again seat seal 104 on seat 70, and thereby closing the canister vent path to atmosphere. Purge valve 20 is also closed, and so the evaporative emission space is sealed. Sensor 74 can now sense pressure differential between the sealed evaporative emission space and atmosphere. The signal provided by sensor 74 is monitored over time by EMC 16, and a determination of the gas-tightness of the space is made according to the methods described earlier in connection with FIGS. 1, 2, and 3.

While the engine is off, springs 90 and 94 serve to hold poppet 92 seated on ridge 98, except when the evaporative emission space pressure rises to a superatmospheric pressure that exceeds the magnitude of bullet P1 by a predetermined amount. With the poppet closed on seat 70, the area of movable wall 64 on which the evaporative emission space pressure is effective equals the total area of the movable wall less the area circumscribed seat 70. Therefore when the pressure in chamber space 68 rises to that superatmospheric pressure, it will be sufficient in relation to the opposite force being exerted by spring 90, to cause movable wall 64 to be displaced toward chamber space 66, thereby unseating poppet 92 from seat 70, and relieving the excess pressure by venting to atmosphere through leak detection monitor 22. When the excess pressure has been relieved, movable wall 64 is again seating poppet 92 on seat 70.

While the engine is off, excess vacuum in the evaporative emission space is also relieved by the action of leak detection monitor 22. It can be seen in FIG. 5 that when poppet 92 is seated on seat 70, atmospheric pressure is communicated to the interior of cup 86 via port 22A and the tubular stem 100 of poppet 92. If the magnitude of evaporative emission space vacuum rises beyond that of bullet V1 by a predetermined amount, the net force acting on movable wall 64 is sufficient to displace it toward chamber space 68. Because poppet 92 is already seated on seat 70, it does not accompany the downward motion of movable wall 64, and so retainer 96 unseats from sealing contact with seal 104. Air can now flow through from the interior of cup 86 through gap 106, through chamber space 68, and through ports 22B and 18B to enter the evaporative emission space, relieving the excess vacuum. When the excess vacuum has been relieved, ridge 98 re-seals against seal 104. Partitions 108 limit the extent to which movable wall 64 can be displaced downward. Should movable wall 64 be displaced far enough downward to cause retainer 96 to abut the top edges of partitions 108 and thereby reduce gap 110 to zero, air for relieving the excess vacuum can still pass from gap 106 through spaces that are circumferentially between partitions 108.

Figure 6:
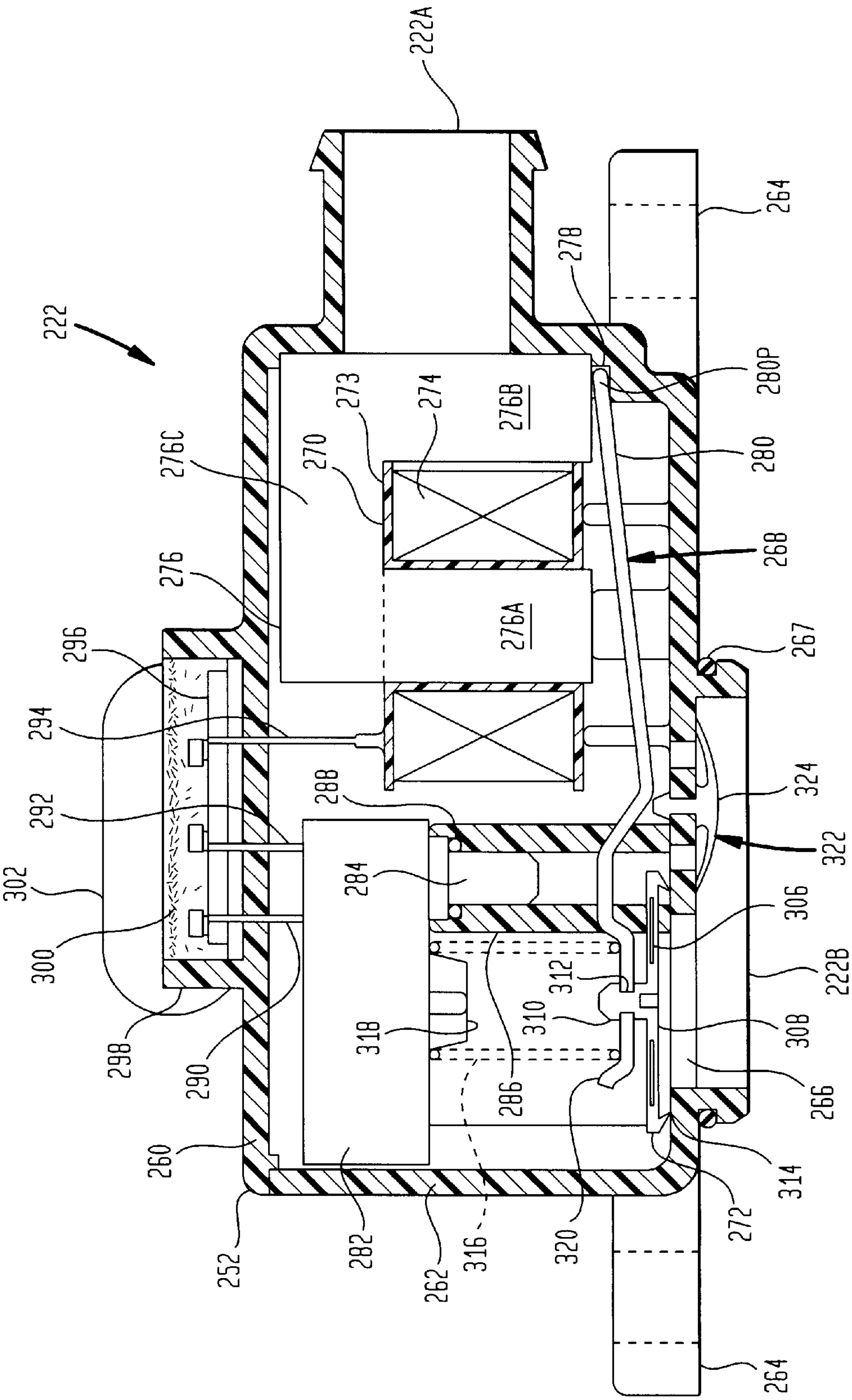
FIG. 6 is a cross section view of a different embodiment of leak detection monitor.
Figure 7:
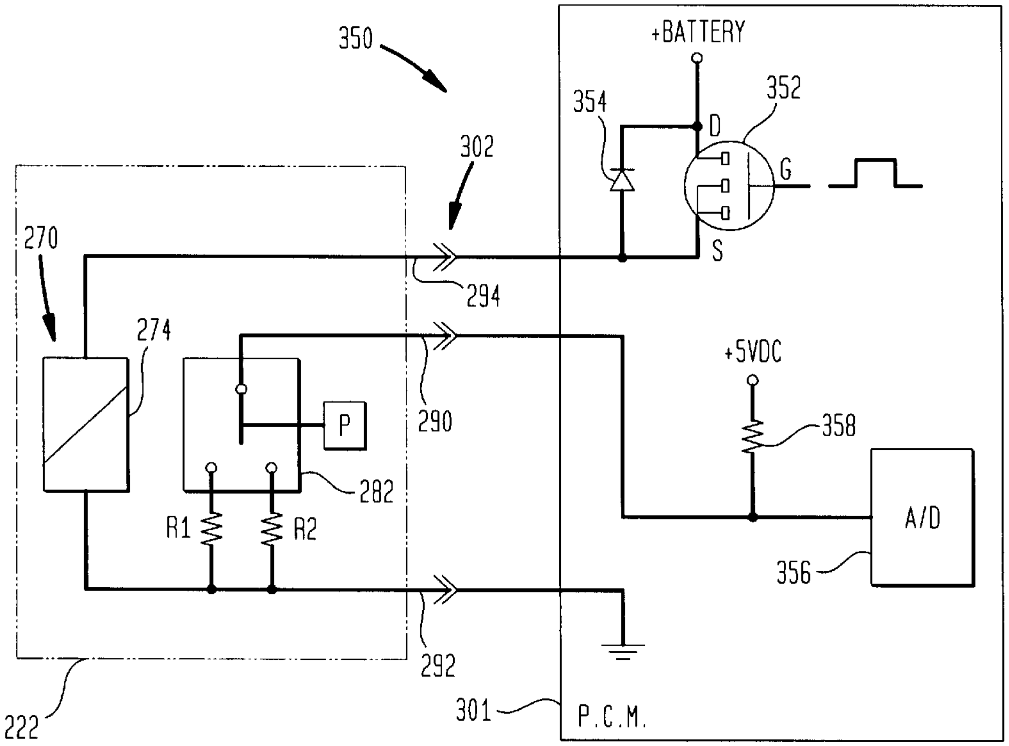
FIG. 7 is an electric schematic diagram related to the embodiment of FIG. 6.

FIGS. 6 and 7 show another embodiment of LDM 222 which comprises ports 222A and 222B corresponding to ports 22A and 22B respectively. Ports 222A and 222B are formed in a lower part 262 of a housing 252. An upper housing part 260 forms a lid, or cover, that provides gas-tight closure of the otherwise open top of part 262. At its bottom, part 262 has external tabs 264 that are apertured to provide for LDM 222 to mount by fastening atop a canister 18 (not shown in FIG. 6) to place port 222B in communication with canister vent port 18B. An O-ring 267 around a short nipple forming port 222B provides the seal.

Unlike LDM 22, the interior of LDM 222 is not divided by a movable wall into two chamber spaces; it instead has a single chamber space to which port 222A continuously communicates, and to which port 222B selectively communicates. The nipple that forms port 222A is open to that interior space through the housing side wall. The portion of the housing bottom wall that is circumscribed by the short nipple forming port 222B contains a circular through-hole 266 to the interior space. An electric-operated vent valve mechanism 268 is disposed within housing 252 for selectively opening and closing through-hole 266. Vent valve mechanism 268 comprises an electromagnet 270 that operates a valve element, or closure, 272 to selectively seat on and unseat from that portion of the housing lower wall that forms the margin of through-hole 266. FIG. 6 shows valve element 272 in seated position, closing the through-hole.

Electromagnet 270 comprises a plastic bobbin 273 on which magnet wire is wound to create an electromagnet coil 274. Electromagnet 270 also comprises a C-shaped ferromagnetic core 276, or C-frame, that comprises a C-shaped stack of ferromagnetic laminations, associated with coil 274. In the drawing, core 276 looks like an upside-down U, having two parallel legs 276A, 276B that extend vertically downward from opposite ends of a horizontal leg 276C. Leg 276A passes internally through the center of bobbin 273 and leg 276B externally along the exterior. The free ends of legs 276A, 276B protrude slightly below the lower end of bobbin 273 to rest on respective formations on the wall of housing part 262 within the housing interior. When cover 260 is closing housing part 262, it aids in immovably confining coil 274 and core 276 within the housing.

The formation on which the end of leg 276B rests contains a channel 278. Disposed within that channel is the pivot 280P of an armature 280. Valve element 272 is disposed on a distal end of armature 280 opposite pivot 280P.

The interior of housing part 262 contains formations for mounting an electric switch, or sensor, 282 for sensing pressure differentials between port 222B and atmosphere which may be positive or negative. Switch 282 comprises a body from which protrudes a nipple that forms a sensing port 284. A hollow cylindrical post 286 extends uprightly from that portion of the housing bottom wall that is circumscribed by the nipple forming port 222B. The nipple forming sensing port 284 is telescopically received in the upper end of post 286, with an O-ring 288 providing a gas-tight seal between the wall of the post and the nipple. Switch 282 has another sensing port that does not appear in the drawing Figure but is open to the interior of housing 252. Switch 282 is thereby rendered effective to sense differentials between port 222B and atmosphere. Two electric terminals 290, 292 of switch 282 extend upward from the switch body, passing through the housing top wall. One electric terminal 294 of coil 274 also passes through the housing top wall. Although not appearing in FIG. 6, the other terminal of coil 274 connects internally of housing 252 in common with terminal 292, as shown by FIG. 7. Passage of the three terminals 290, 292, 294 through the housing top wall is made gas-tight by a sealing gasket 295 that is disposed external to the housing interior chamber space beneath an overlying printed circuit board 296 with which terminals 290, 292, and 294 join.

An upstanding perimeter wall 298 on the exterior of part 260 bounds circuit board 296 and possesses sufficient height to contain potting compound that is applied in uncured form over circuit board 296 and allowed to cure to thereby form an encapsulant 300 for the circuit board and the connections of the terminals to it. An electric connector 302 is associated with circuit board 296 to provide for the circuit board to be connected to a power control module (PCM) 301, shown in FIG. 7, through which EMC 16 operates leak detection monitor 222 during performance of a leak test. PCM 301 may be a portion of EMC 16 and coupled to connector 302 by wiring that forms connection 38. As may be appreciated by also considering the schematic diagram of FIG. 7, circuit board 296 contains conductors that provide continuity between individual terminals of connector 302 and terminals 290, 292, 294.

Closure 272 comprises a rigid disk 306, stamped metal for example, onto which elastomeric material 308 has been insert molded so that the two are intimately united to form an assembly. The elastomeric material forms a grommet-like post 310 that projects perpendicularly away from, and to one axial side of, the center of disk 306. Post 310 comprises an axially central groove 312 providing for the attachment of closure 272 to the distal end of armature 280. At the outer margin of disk 306, the elastomeric material is formed to provide a lip seal 314 that is generally frusto-conically shaped and canted inward and away from disk 306 on the axial side of the disk opposite post 310. It is lip seal 314 that provides sealing contact with the margin of through-hole 266 when the closure is closing the through-hole. As lip seal 314 makes and breaks contact with the margin of through-hole 266, it makes what is considered a beneficial wiping action that may aid in maintaining mating surfaces free of particulate and dust that otherwise might cause loss of sealing integrity when closure 272 is closed.

The exterior of the body of switch 282 contains a spring locator 318 coaxial with through-hole 266. The distal end of armature 280 is formed with a spring locator 320 substantially coaxial with spring locator 318. Opposite ends of a helical coil compression spring 316 are located by the two spring locators so that the compressed spring resiliently acts on the distal end of armature 280 to cause closure 272 to close through-hole 266.

Another portion of the bottom housing wall circumscribed by the nipple forming port 222B contains a one-way valve 322 that allows gas flow in a direction from the housing interior into the canister, but not in an opposite direction. Valve 322 comprises an elastomeric umbrella valve element 324 mounted on an appropriately apertured portion of the bottom housing wall.

FIG. 7 shows an electric circuit 350 that schematically relates PCM 301, circuit board 296 (shown in FIG. 6), terminals 290, 292, 294, electromagnet 270, and switch 282. One circuit of PCM 301 comprises a mosfet 352 and a diode 354 which is connected between the source and drain terminals of the mosfet, as shown. Another circuit of PCM 301 comprises a resistor 358 and an analog-to-digital (A/D) converter 356, connected as shown. Power supply voltages +BATTERY and +5 VDC provide electric power as indicated. A control signal is supplied by EMC 16 to the gate terminal of mosfet 352 for controlling the conductivity of the mosfet.

In a condition where coil 274 is not being energized, spring 316 is forcing armature 280 to close port 222B to the interior of housing 252. Should vacuum begin developing in the evaporative emission space while port 222B is closed, valve 322 will open at a certain threshold to prevent the vacuum from rising above a preset limit. When coil 274 is energized, electromagnet 270 exerts an attractive force on armature 280, causing the armature to swing clockwise about its pivot and lift closure 272 from through-hole 266, thereby opening the vent valve so that the evaporative emission space is freely vented to atmosphere. Coil 274 is energized by the application of a signal to the gate of mosfet 352 from EMC 16, rendering the mosfet conductive for current flow to the coil. Operating current for coil 274 can be limited by appropriate methods such as positive temperature coefficient (PTC) resistors or reducing pulse width of a pulse width modulated control signal. In that way, the pull-in current that is needed to displace armature 280 to open the vent valve can be reduced to a smaller holding current for maintaining the vent valve open once the armature has been displaced.

Whereas leak detection monitor 22 employs engine intake system vacuum, that is available when the engine is running, to open the canister atmospheric vent port, leak detection monitor 222 utilizes electric energy. With the engine running, electromagnet 270 is energized by electric current flow through coil 274, causing closure 272 to open through-hole 266. When the engine stops running, electric current flow to coil 274 ceases, allowing spring 316 to force closure 272 into re-closing through-hole 266. If the evaporative emission space pressure reaches the level of bullet P1 after such closure, switch 282 will operate to place a first resistance value R1 between terminals 290 and 292. That event is interpreted by PCM 301 as a signal indicative of the pressure having risen to the P1 level. If the evaporative emission space pressure thereafter diminishes to a point that develops a vacuum corresponding to the level of bullet V1, then switch 282 will operate to place a second resistance value R2, different from the resistance value R1, between terminals 290 and 292. That event is interpreted by PCM 301 as a signal indicative of the pressure having fallen to a vacuum level equal to that of bullet V1. After a pressure rise to the level of bullet P1, a further increase that causes the pressure in the space to exceed the level of bullet P1 by a predetermined amount is considered an excess pressure. Such pressure will cause closure 272 to unseat from through-hole 266 until the excess pressure has been relieved. Any evaporative emission space vacuum exceeding bullet V1 by a predetermined amount while the engine is off will act to open valve 322, allowing the excess vacuum to be relieved.

opening of closure 272 to vent excess pressure may be caused in either of two ways. The spring characteristics of spring 316 may be chosen in relation to the armature and closure such that, with coil 274 not energized, the net force acting on the closure causes it to open upon the pressure rising to the excess pressure. Switch 282 may include a capability for signaling such excess pressure, and PCM 301 may respond by energizing coil 274 to open the vent until the excess pressure has been relieved.

Hence, switch 282 is a pressure/vacuum switch that is capable of signaling both pressure corresponding to bullet P1 and vacuum corresponding to bullet V1. Leak detection monitor 222 makes a leak determination in the same manner as leak detection monitor 22, with reference to FIGS. 1, 2, and 3. If pressure corresponding to bullet P1 occurs, switch 282 assumes a corresponding condition that is read by EMC 16 as indicative of the occurrence of such an event. If vacuum corresponding to bullet V1 occurs, switch 282 assumes a corresponding condition that is read by EMC 16 as indicative of the occurrence of such an event. The reading of those two events in the order mentioned, within a relevant time period of a test, is deemed to indicate the absence of a leak, or at most a leak smaller than a small leak. The reading of neither event is deemed indicative of a gross leak. The reading of pressure corresponding to bullet P1, but of no vacuum corresponding bullet V1, is deemed indicative of a small leak.

Leak detection monitor 222 may also function during re-fueling of tank 14 to vent the tank headspace to atmosphere and thereby avoid possible impediment of the re-fueling. With the engine shut off, coil 274 is not energized, and so the evaporative emission space may not vented because closure 272 is closed. Re-fueling that creates sufficient pressure increase may be effective to cause switch 282 to signal PCM 301 to energize coil 274, thereby venting the space to atmosphere through the leak detection monitor.

It is believed that embodiments of the invention disclosed herein may provide cost-effective leak detection compliance with certain applicable regulations when compared to certain other leak detection devices. It should be understood that because the invention may be practiced in various forms within the scope of the appended claims, certain specific words and phrases that may be used to describe a particular exemplary embodiment of the invention are not intended to necessarily limit the scope of the invention solely on account of such use.

What is claimed is:

1. A leak detection monitor for an on-board evaporative emission leak detection system that detects leakage from an evaporative emission space of a fuel system for an engine of an automotive vehicle, the leak detection monitor comprising:

a housing extending along a longitudinal axis and defining an interior volume;

a separation member disposed within the housing and dividing the interior volume into a first housing chamber and a second housing chamber;

a first port disposed through the housing and in communication with the first housing chamber, the first port adapted to communicate with a manifold;

a second port disposed though the housing and in communication with the second housing chamber, the second port adapted to communicate with the evaporative emission space;

a third port disposed through the housing and in communication with the second housing chamber, the third port adapted to communicate with atmosphere;

a metering member disposed in the interior volume, the metering member positionable in a closed position prohibiting flow between the second and third ports and an open position to permitting flow therebetween;

a pressure sensor disposed in the interior volume, the pressure sensor adapted to measure relative pressures between the second and third ports and to output an electrical signal in response to the relative pressures; and an actuating member adapted to position the metering member in the open position when the engine is being operated and in the closed position when the engine is not being operated.

2. The monitor according to claim 1, wherein the metering member comprises a poppet and a seat, the poppet movable relative to the seat to achieve the open and the closed positions.

3. The monitor according to claim 2, wherein the metering member comprises a cup and first and second resilient members, a portion of the cup surrounding the poppet and the seat, the first resilient member extending along the longitudinal axis and being disposed between the housing and the cup, and the second resilient member extending along the longitudinal axis and being disposed between the cup and the poppet to urge the poppet to the closed position.

4. The monitor according to claim 3, wherein the separation member comprises a diaphragm.

5. The monitor according to claim 4, wherein the separation member comprises a flexible annular diaphragm having an inside edge and an outside edge, the inside edge connected and achieving a fluid-tight seal with the cup, and the outside edge connected and achieving a fluid-tight seal with the housing.

6. The monitor according to claim 5, wherein the poppet comprises a captured portion and a sealing portion, the captured portion being surrounded by the first resilient member and the sealing portion achieving a fluid-tight seal with the poppet achieves the closed position.

7. The monitor according to claim 6, wherein the captured portion comprises a hollow cone extending along the longitudinal axis away from the sealing portion and the seat.

8. The monitor according to claim 7, wherein the cup comprises a first cup portion having a concave surface facing the seat, and a second cup portion having first and second edges, the first edge being connected with the first cup portion, a diameter of the second cup portion being greater that a diameter of the first cup portion.

9. The monitor according to claim 8, wherein the cup comprises a third cup portion having inside and outside edges, the inside edge being connected with the second edge of the second cup portion, the outside edge being connected with the separation member, a diameter of the outside edge being greater than a diameter of the inside edge.

10. The monitor according to claim 9, wherein each of the first and second resilient members comprises a compression spring.

11. The monitor according to claim 10, wherein the housing includes an upper housing member and a lower housing member, the upper and lower housing members being connected to form the housing and to define the interior volume.

12. The monitor according to claim 11, wherein a portion of the separation member is disposed between the upper and lower housing members, the upper housing member and the separation member defining the first housing chamber, and the lower housing member and the separation member defining the second housing chamber.

13. The monitor according to claim 12, wherein the first port is formed from the upper housing member, and each of the second and third ports are formed from the lower housing member.

14. The monitor according to claim 13, wherein the first and third ports extend in a direction perpendicular to the longitudinal axis, and the second port extends along the longitudinal axis.

15. The monitor according to claim 14, wherein the metering member defines an atmosphere chamber with the third port and an emission chamber with the second port.

16. The monitor according to claim 15, wherein the atmosphere chamber comprises a first atmosphere tube extending perpendicular to the longitudinal axis, a second atmosphere tube extending along the longitudinal axis and in communication with the first atmosphere tube, and a third atmosphere tube extending along the longitudinal axis and in communication with the second pressure tube and the pressure sensor, each of the first, second, and third atmosphere tubes having a circular cross-section.

17. The monitor according to claim 16, wherein the emission chamber comprises an emission tube having a circular cross-section and extending along the longitudinal axis, and an emission volume in communication with the emission tube.

18. The monitor according to claim 17, wherein the pressure sensor is disposed within the emission chamber.

19. The monitor according to claim 18, wherein the lower housing includes an exterior surface that is adapted for direct connection with a fuel vapor collection canister.

20. The monitor according to claim 19, further comprising:

a resilient sealing member disposed on an exterior surface of the second port, the resilient sealing member adapted to achieve a fluid-tight seal between the second port and the canister.

21. The monitor according to claim 20, wherein each of the first and third ports includes a barb on an exterior surface, the barb adapted to achieve a fluid-tight connection.

22. The monitor according to claim 21, wherein the upper and lower housing members each include cooperating attachment features, the features achieving a snap fit to secure the housing members with one another.

23. The monitor according to claim 22, further comprising:

a fourth port disposed in the lower housing, the fourth port adapted to output the electrical signal from the pressure sensor.

24. The monitor according to claim 23, wherein the pressure sensor further comprises a contact, the contact adapted to output the electrical signal.

25. The monitor according to claim 24, wherein the fourth port extends perpendicular to the longitudinal axis.

26. The monitor according to claim 25, wherein the separation member includes a concave surface facing the lower housing member and a convex surface facing the upper housing member.

27. The monitor according to claim 26, wherein a maximum thickness of the separation member is disposed between the upper and lower housing members.

28. The monitor according to claim 27, where the seat comprises an annular disk, the annular disk being disposed on and achieving a fluid-tight seal with an end of the second atmosphere tube.

29. The monitor according to claim 28, wherein the emission volume includes at least one partition member.

30. The monitor according to claim 29, wherein the emission volume includes a plurality of partition members that are circumferentially spaced apart and extend radially, each of the partition members having a generally rectangular shape.

31. A method of diagnosing an evaporative emission control system to determine if a leak is present in the system, the method comprising:

sealing the system from external influences;

monitoring a pressure level within the system over a cooling period; and indicating a potential leak condition through a comparison of the pressure level within the system and a given threshold.

32. The method according to claim 31, further comprising:

indicating a second potential leak condition through a comparison of the pressure level within the system and a second given threshold.

33. The method according to claim 32, further comprising:

indicating a first potential leak condition if the pressure level within the system does not fall below a first given threshold over the cooling period.

34. The method according to claim 31, further comprising:

indicating a second potential leak condition if the pressure level within the system does not rise above a second given threshold over the cooling period.

35. The method according to claim 32, wherein the first and second potential leak conditions comprise small and gross leaks, respectively, a volume of the small leak being less than a volume of the gross leak.

36. The method according to claim 35, wherein monitoring comprises monitoring the pressure level in a chamber of a housing having first and second volumes.

37. The method according to claim 36, wherein sealing comprises sealing a first port in communication with the first volume and atmosphere from a second port in communication with an evaporative emission space.

38. The method according to claim 37, further comprising:

disposing a pressure sensor in the second volume.

39. The method according to claim 38, wherein monitoring comprises monitoring the pressure level between the first and second port with the pressure sensor.

40. The method according to claim 39, further comprising:

disposing a metering member in the housing to define the first volume with the first port and the second volume with the second port.

41. The method according to claim 35, wherein monitoring comprises monitoring a first pressure level at a first port in communication with atmosphere and a second pressure level at a second port in communication with an evaporative emission space.

42. The method according to claim 41, wherein sealing comprises sealing the first port from the second port.

43. The method according to claim 42, further comprising:

disposing a metering member in the integrated housing to define a first volume in communication with the first port and a second volume in communication with the second port.

44. The method according to claim 41, further comprising:

disposing a pressure sensor in the second volume.

45. The method according to claim 44, wherein monitoring comprises monitoring a first pressure at the first port and a second pressure at the second port.

46. A method of diagnosing an evaporative emission control system to determine if a leak is present in the system, the method comprising:

sealing the system from external influences; and monitoring a first pressure level at a first port in communication with atmosphere of an integrated housing and a second pressure level at a second port in communication with an evaporative emission space, the first and second ports disposed within a unitary housing.

47. The method according to claim 46, further comprising:

indicating a potential leak condition through a comparison of the first and second pressure levels.

48. The method according to claim 47, further comprising:

indicating a second potential leak condition through a comparison of the first and second pressure levels.

49. The method according to claim 48, further comprising:

indicating a first potential leak condition if the second pressure level within the system does not fall below a first given threshold over the cooling period.

50. The method according to claim 49, further comprising:

indicating a second potential leak condition if the second pressure level within the system does not rise above a second given threshold over the cooling period.

51. The method according to claim 50, wherein the first and second potential leak conditions comprise small and gross leaks, respectively, a volume of the small leak being less than a volume of the gross leak.

52. The method according to claim 51, wherein sealing comprises sealing the first port from the second port of the unitary housing.

53. The method according to claim 46, further comprising:

disposing a metering member in the unitary housing to define a first volume with the first port and a second volume with the second port.

54. The method according to claim 53, further comprising:

disposing a pressure sensor in the second volume.

55. The method according to claim 54, wherein monitoring comprises monitoring with the pressure sensor the first pressure and the second pressure.

56. An on-board evaporative emission leak detection system for detecting leakage from an evaporative emission space of a fuel system for an engine of an automobile, comprising:

a canister in communication with the evaporative emission space;

a filter in communication with atmosphere; and a monitor adapted to measure the leakage, the monitor comprising:

a housing extending along a longitudinal axis and defining an interior volume;

a first port disposed through the housing and in communication with a first portion of the interior volume and the canister;

a second port disposed through the housing and in communication with a second portion of the interior volume and the filter; and a metering member disposed in interior volume and defining the first portion with the first port and the second portion with the second port, the metering member positionable in a closed position prohibiting flow between the ports and an open position permitting flow between the ports.

57. The system according to claim 56, wherein the monitor comprises a separation member disposed within the housing to divide the interior volume into a first housing chamber including the first and second portions of the interior volume, and a second housing chamber that is isolated from the first housing chamber.

58. The system according to claim 57, wherein the monitor comprises a third port in communication with a manifold.

59. The system according to claim 58, wherein the metering member comprises a poppet and a seat, the poppet positionable along the longitudinal axis to the open and closed positions.

60. The system according to claim 59, wherein the metering member comprises a cup and first and second compression springs, a portion of the cup surrounding the poppet and the seat, the first spring extending along the longitudinal axis and being disposed between the housing and the cup, and the second spring extending along the longitudinal axis and being disposed between the cup and the poppet to urge the poppet to the closed position.

61. The system according to claim 60, wherein the separation member comprises a diaphragm.

62. The system according to claim 61, wherein the housing includes an upper housing member and a lower housing member, the upper and lower housing members being connected to form the housing and to define the interior volume.

63. The system according to claim 62, wherein the lower housing member forms each of the first and second ports, and the upper housing member forms the third port.

64. The system according to claim 63, further comprising:

a pressure sensor measuring a first pressure at the first port and a second pressure at a second port.

65. The system according to claim 64, wherein the pressure sensor is disposed within the housing.

66. The system according to claim 65, wherein the pressure sensor is disposed within the first portion of the interior volume.

67. The system according to claim 66, wherein the first port extend along the longitudinal axis, and each of the second and third ports extend perpendicular to the longitudinal axis.

68. The system according to claim 67, wherein the second portion comprises a first atmosphere tube extending perpendicular to the longitudinal axis, a second atmosphere tube extending along the longitudinal axis and in communication with the first atmosphere tube, and a third atmosphere tube extending along the longitudinal axis and in communication with the pressure sensor, each of the first, second, and third atmosphere tubes having a circular cross-section.

69. The system according to claim 68, wherein the first portion comprises an emission tube having a circular cross-section and extending along the longitudinal axis, and emission volume in fluid communication with the emission tube.

70. The system according to claim 69, wherein the pressure sensor is disposed within the emission volume.

71. The system according to claim 70, wherein the lower housing member includes an exterior surface adapted for direct connection with the canister.

72. The system according to claim 71, further comprising:

a fourth port disposed in the lower housing member, the fourth port adapted to output an electrical signal from the pressure sensor.

73. The system according to claim 72, wherein the fourth port extends perpendicular to the longitudinal axis and has a circular cross-section.

* * * * *